June 2, 1959      L. PÉRAS      2,888,846

COLD-HAMMERING DEVICE

Filed Dec. 12, 1956      5 Sheets-Sheet 1

June 2, 1959  L. PÉRAS  2,888,846
COLD-HAMMERING DEVICE
Filed Dec. 12, 1956  5 Sheets-Sheet 2
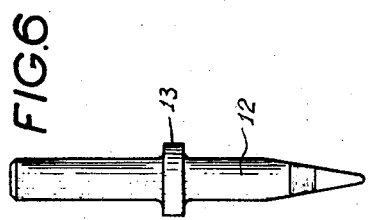
FIG.6
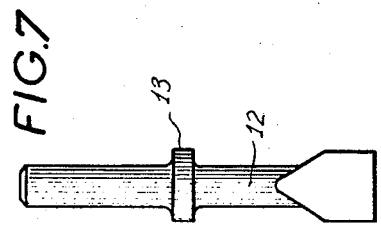
FIG.7
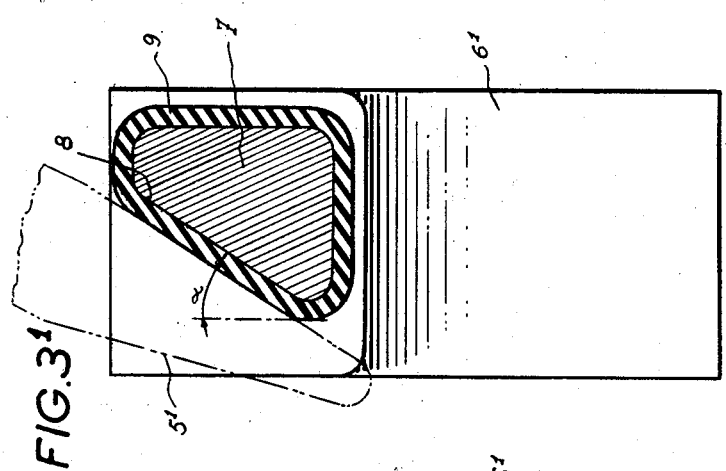
FIG.3¹
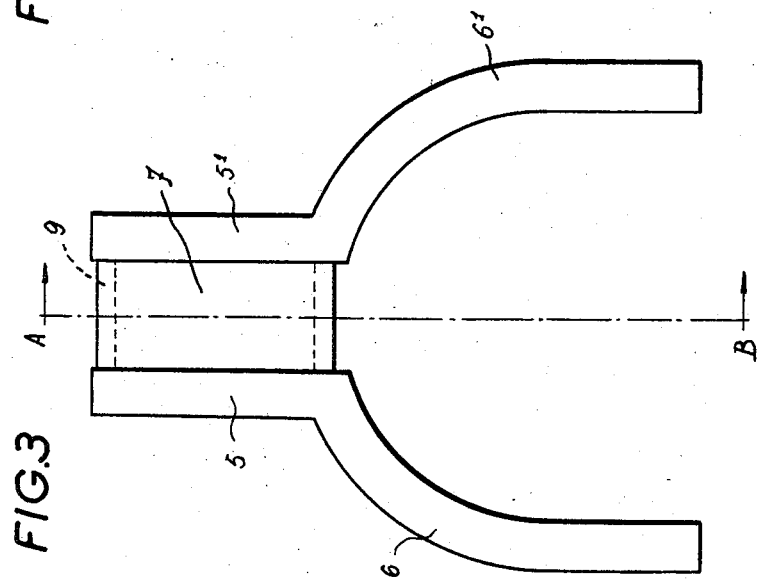
FIG.3

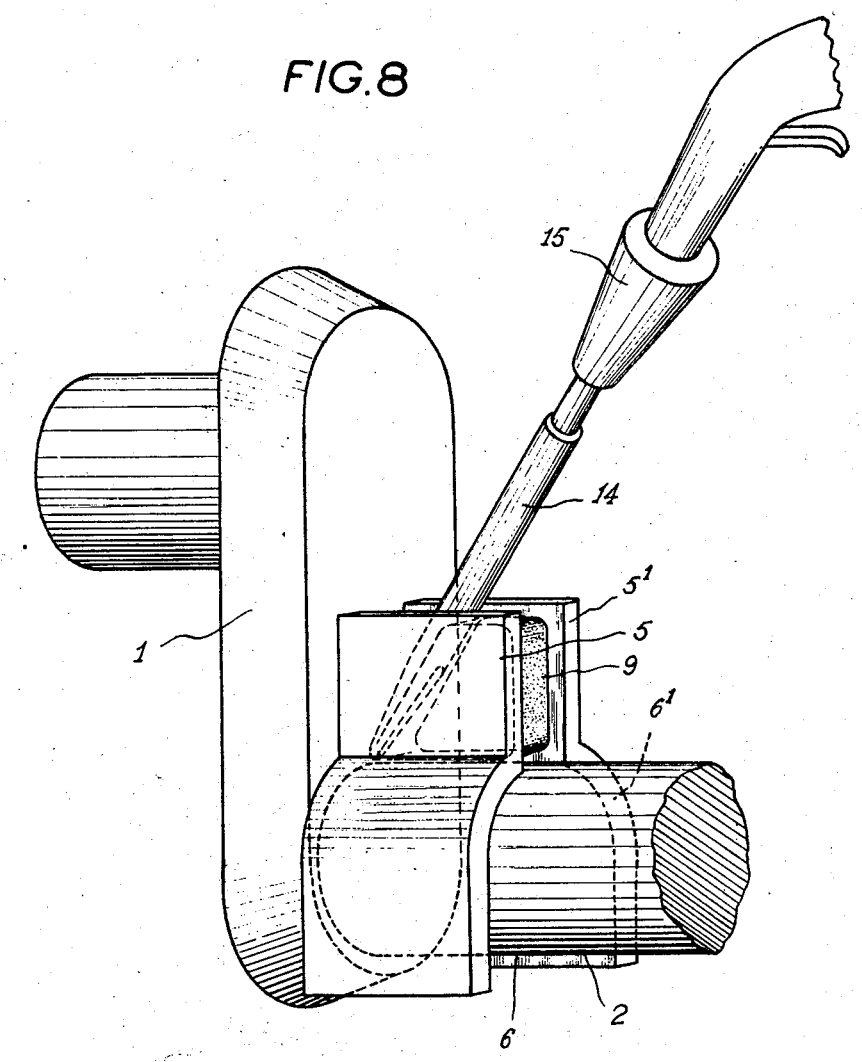

June 2, 1959

L. PÉRAS 2,888,846

COLD-HAMMERING DEVICE

Filed Dec. 12, 1956

United States Patent Office 2,888,846
Patented June 2, 1959

2,888,846
COLD-HAMMERING DEVICE

Lucien Péras, Billancourt, France, assignor to Regie Nationale des Usines Renault, Billancourt, France Application December 12, 1956, Serial No. 627,899

Claims priority, application France, February 15, 1956

3 Claims. (Cl. 78—13)

The invention relates to an apparatus for the cold hammering of certain metals, and is applied more particularly to the crankshafts of internal combustion engines.

It is known that after cold hammering, certain metals, particularly steels, acquire considerable tensile strength. When suitably carried out, cold hammering sets up in preselected zones stresses which are favourable to the improvement of the apparent fatigue limit of the part so treated. Thus, in the crankshaft of an engine, for example, the fillets joining the crankwebs to the shaft being, in certain parts, zones of concentration of dynamic stresses, it is favourable to effect cold hammering of those zones.

The invention relates further to a tool-carrier apparatus permitting easy and rapid hammering of the fillets of crankpins and of bearing surfaces co-operating with the crankwebs.

Tests for determining the apparent rotary flexion fatigue limit on a nickel-chrome steel test piece treated in the mass, for $R$=about 100 kg., have given the following comparative results:

|   | Apparent fatigue limit in kg. per sq. mm. |
|---|---|
| 1. Test piece without groove, not mechanically treated | 46 |
| 2. Test piece with groove, mechanically treated | 22 |
| 3. Test piece with granular groove | 22 |
| 4. Test piece with groove, subjected to surface heat treatment (heating of the groove by induction and tempering) | 30 |
| 5. Test piece with hammered groove | 32.5 |

The invention also relates to a simple apparatus capable of carrying out the hammering of crankshafts on an industrial scale, by treating at the same time, and according to suitable angles, the two fillets of the same crankpin with the aid of an ordinary hammering tool despite the difficult accessibility of this zone.

The apparatus of the invention comprises a tool support in which slides, under the action of a pneumatic hammer or any other device of the same nature, a rod the free end of which produces percussions on two tools disposed in a V arrangement at the end of the support and acting on the fillets of the crankpin.

According to the invention there is provided a device intended to obtain by cold hammering increased resistance to fatigue in certain parts, more particularly applicable to an engine crankshaft for increasing the local strength of the connection fillets of the crankpins, and in which a tool of suitable shape corresponding to the work to be done receives a vibratory movement in a guide placed astride the crankpin, while a rotary movement is imparted either to the guide or to the crankpin around the axis of the latter.

Specific embodiments of the invention will now be described by way of example with reference to the accompanying drawings in which:

Figure 1 illustrates a tool placed on the fillet of a crankshaft and enabling hammering to be carried out under the conditions of the invention;

Figure 1' shows on a larger scale the arrangement shown in Figure 1 for a tool having a single radius of curvature;

Figure 2 shows on a larger scale a modified form of construction of the tool having two different radii of curvature;

Figures 3, 3' show the arrangement used for holding the tool;

Figures 6 and 7 show an alternative form of construction of the tool on a smaller scale;

Figure 8 shows the pneumatic hammer and hammering tool assembled and placed in the mounting surrounding the crankpin;

Figure 9:
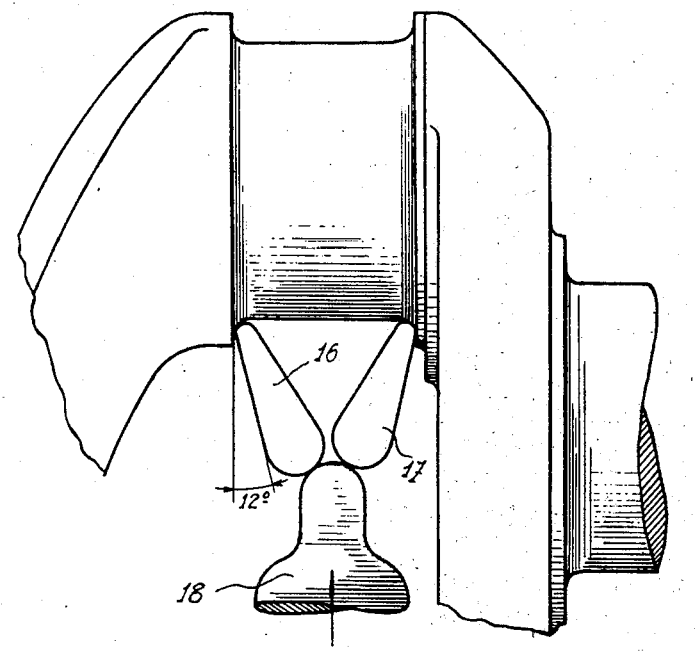
Figure 9 illustrates the device used for effecting the simultaneous hammering of the two fillets of a single crankpin.
Figure 10:
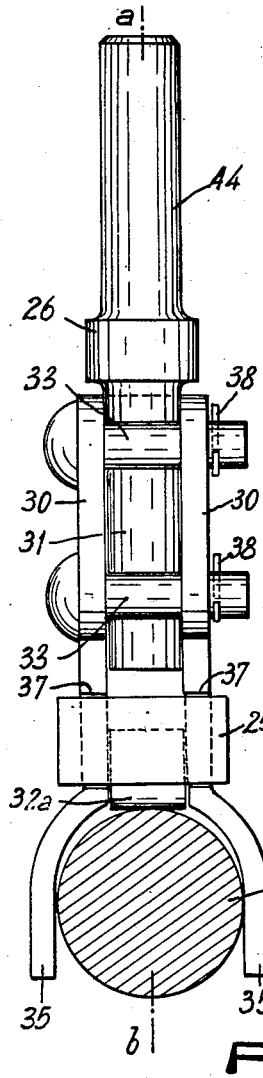
Figure 11:
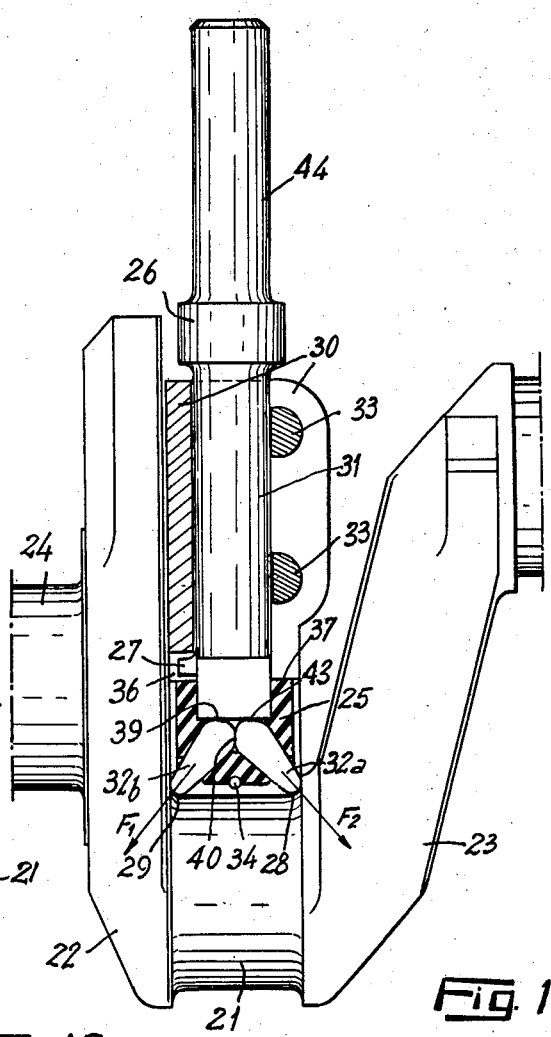
Figure 12:
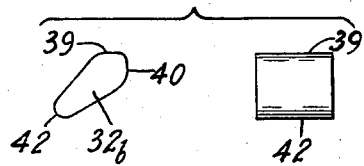
Figure 13:
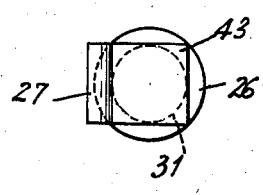

Figure 10 relates to the construction of a particularly advantageous mounting of the tools, referring to the arrangement illustrated in Figure 9;

Figure 11 is a view in section, on the line $a$—$b$ of Figure 10, of the tool in the operating position on a crankshaft crankpin;

Figure 12 is a detailed view of a hammering tool;

Figure 13 is a view from below of the controlled hammering rod illustrated in Figure 11.

Figure 1:
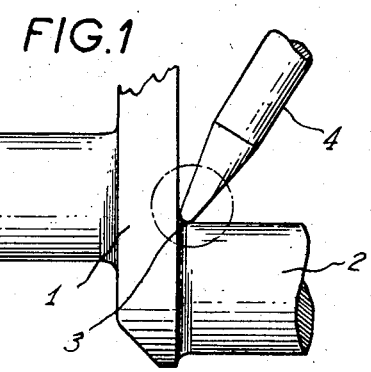

Referring now to the drawing, and more particularly to Figure 1, where part of a crankshaft is shown at 1 with a crankpin at 2, the fillet 3 of the crankshaft has undergone an operation known as "undercut," either solely with the aid of the tool 4 or first by machining and then by means of the tool 4.

Figure 2:
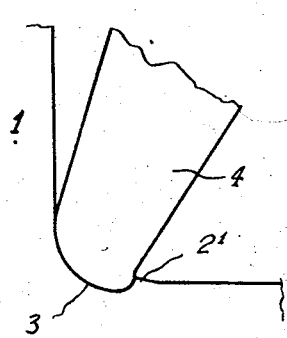
Figure 1:
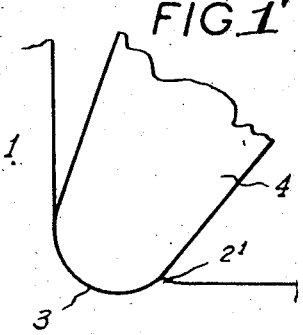

Figure 1' shows on a larger scale a construction of a tool used for hammering, the tool 4 having the shape corresponding to a single radius of curvature. The tool illustrated in Figure 2 has two different radii of curvature.

By means of a pneumatic hammer, for example, the tool is given a longitudinal vibratory movement while located against the fillets at the same time as the crankshaft is rotated around the axis of the crankpin 2. A burr in the form of a bead $2^1$ is formed which is later removed by grinding.

Figures 3, 3' show a guide mounting for the hammer tool. This mounting is of substantially U-section, as shown in elevation in Figure 3 in side view. Figure 3' is a section on the line A—B in Figure 3. The guide mounting comprises two arms 5, 5' which are extended by yokes 6, 6', the arms 5, 5' being connected by a bridge 7 which may be solid or hollow depending on the mode of manufacture of this support device guiding the tool. The face 8 of the bridge 7 is inclined to a suitably determined angle to serve as a support for the tool for the work to be carried out. The bridge 7 is surrounded with a resilient covering 9 of suitable thickness and on which the tool is guided during the work. The arms 6, 6' form a yoke and are placed on the crankpin so as to sit astride or over it. The tool is shown in Figure 3' in broken lines in operating position on the bridge 7.

Figure 4:
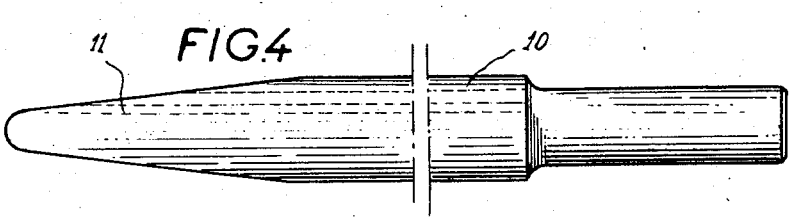
Figures 4 and 5 show a form of construction of the tool used.
Figure 5:
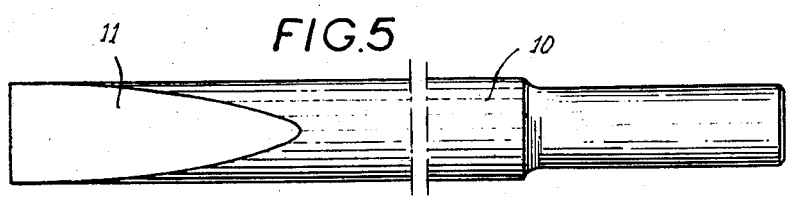

Figures 4 and 5 illustrate a tool 10 intended to be used for the hammering work and having a cylindrical part flattened at its end at 11 and ending in a radius edge.

Figures 6 and 7 show a tool 12 of a slightly different shape with a central circular shoulder 13.

Figure 8 shows the guide mounting illustrated in Figures 3 and 3' in position on the crankpin, while its bridge 7 serves to support the tool 14 connected to the pneumatic hammer 15.

The device functions in the following manner:

The yokes 6, 6' of the guide mounting are placed over the crankpin 2. The assembly comprising the tool 14 and pneumatic hammer 15 are so disposed that the tool lies against the resilient face 8 between the arms 5, 5' of the guide mounting. During the course of the hammering, the guide 5, 5' is turned around the crankshaft so as to hammer the desired part of the fillet. Alternatively the guide could be held in a fixed position and the crankshaft turned around the axis of the crankpin.

A sort of lathe could also be constructed provided with a plurality of hammer-carrying carriages which might or might not use the above described yoke-shaped guides. In the latter case, the body of each hammer would be fixed, rigidly or otherwise, on the carriages of the lathe and each hammer would have a device for guiding the hammering tool. In this way, a number of fillets could be hammered simultaneously.

It will be observed that the resilient covering 9 of the bridge 7 will tend to apply the tool elastically against the surface to be worked and to maintain the tool against said surface.

As an alternative, the simultaneous hammering of the two fillets of the same crankpin could be effected with the aid of the device illustrated in Figure 9.

The two hammering tools 16, 17 guided by an arrangement (not shown) are acted on by the hammer 18 and thus effect the desired hammering.

Apparatus suitable for effecting simultaneous hammering of two fillets is illustrated in Figures 10 and 11 and comprises a support or frame 30 having a U-shaped cross-section, the branches of which end at the bottom part in the two curved arms 35, which in the working position lie astride the crankpin 21 of the crankshaft illustrated partially in Figure 11, which comprises the crank-webs 22 and 23 and the journal 24.

A shank 31 is mounted with play inside the frame 30 and is guided in a horizontal plane by the frame 30 and by the two pins 33 passing through the branches of the frame and held in position by the pins 38; a projection 27 and a shoulder 26 provided on the shank 31 limit its longitudinal displacement in the frame.

At the bottom end of the rod 31, two small hammering tools 32a and 32b, disposed in an inverted V formation, are held in position by a ring 25 and a spacer 41 of resilient material withstanding the action of oil. The ring 25 is held under tension around the frame 30 with the rod 31, with the assistance of the recesses 36 and 37 provided for the purpose in the frame 30; the spacer 41 is fixed by the pin 34 passing through the two arms 35 of the frame 30.

This elastic fastening has the sole purpose of maintaining the two hammering tools in position in the apparatus while enabling them to move freely in relation to one another and to take up position, as shown in Figure 12, in the fillets 28 and 29 of the crankpin 21 of the crankshaft.

Each hammering tool is composed of a hard steel piece, such as cold chisel steels, and its section has a shape resembling that of a wedge with rounded angles, as illustrated in Figure 13. One of the ends 42 has a radius very close to that of the fillet to be treated, and the two surfaces 39 and 40 have a curve of large radius. The angles of the different faces to one another are so determined that the resultants $F^1$ and $F^2$ (Figure 11) of the forces that are transmitted by the hammering tools are perpendicular to the centre of curvature of the fillet to be treated. The end 44 of the shank 31 is intended to receive the percussions of a pneumatic hammer or of any other device producing the same effect; this shank 31 has at its other end a plane surface 43 which acts on the hammering tools.

The device functions in the following manner:

The apparatus is placed astride the crankpin to be treated, as shown in Figure 10, and the percussions produced, for example, by a pneumatic hammer are applied to the end 44 of the rod 31. The latter transmits them through its other end 43 to the upper curved faces 39 of the hammering tools, which bear against one another by their second upper curved faces 40, and these hammering tools in turn transmit the pressures through the ends 42 to the fillets 28 and 29 which it is desired to cold hammer.

In order to obtain regular hammering, in the directions of the arrows $F^1$ and $F^2$, it is sufficient to turn the crankshaft or the tool regularly in relation to one another during the course of the work, at a suitable speed.

The comparative improvements obtained on the automobile crankshafts tested for plane flexibility fatigue were as follows:

|  | Moment in m. kg. |
|---|---|
| (a) On a cast steel crankshaft without usual treatment | 53.8 |
| (b) On a cast steel crankshaft with hammering | 97.5 |
| (c) On a cast steel crankshaft with intercut | 58.1 |
| (d) On a cast steel crankshaft with hammered intercut | 116.7 |

What I claim is:

1. Apparatus for work hardening a workpiece comprising, in combination, a hollow, elongated first guide, a pair of reciprocable, elongated, cooperating tools mounted on an end portion of said guide and extending longitudinally and radially outwardly of the guide in an inverted V arrangement with the outermost end portions thereof spaced apart, the pair of tools having cooperating faces at end portions opposite said spaced end portions, thereof, non-metallic second guide means disposed in the first guide comprising a resilient disc having a portion disposed circumferentially of the pair of tools for guiding the pair of tools along paths corresponding substantially with the longitudinal axis thereof and for urging them into a housed position in said first guide with said faces cooperating, a reciprocably driven rod disposed axially in said first guide and guided therein for impacting the pair of tools simultaneously thereby to cause them to reciprocate and impact the workpiece when said apparatus is employed on said workpiece.

2. Apparatus for work hardening a workpiece comprising, in combination, a hollow elongated first guide having a yoke at one end thereof for releasably mounting the apparatus on a workpiece, a pair of reciprocable, elongated, cooperating tools mounted on said end portion of said guide and extending longitudinally and radially outwardly of the guide in an inverted V arrangement with the outermost end portions thereof spaced apart, the pair of tools having cooperating faces at end portions opposite to said spaced end portions thereof, second guide means comprising a resilient disc in the first guide for guiding the pair of tools along paths corresponding substantially with the longitudinal axis thereof and for urging them into a housed position in said first guide with said faces cooperating, a reciprocably driven rod disposed axially in said first guide and guided therein for impacting the pair of tools simultaneously thereby to cause them to impact the workpiece when said apparatus is employed on said workpiece.

3. Apparatus for work hardening a workpiece comprising, in combination, a hollow elongated first guide having means for releasably mounting the apparatus on a workpiece, a pair of reciprocable, elongated, cooperating tools mounted on said end portion of said guide and extending longitudinally and radially outwardly of the guide in an inverted V arrangement with the outermost end portions thereof spaced apart, the pair of tools having cooperating faces at end portions opposite to said spaced end portions thereof, second guide means in the first guide for guiding the pair of tools along paths corresponding substantially with the longitudinal axis thereof and for urging them into a housed position, in said first guide with said faces cooperating, said second guide means comprising a disc of resilient, non-metallic material having a pair of holes disposed for guiding the pair of tools along said paths, said pair of tools being disposed in said holes, said disc having a central recess forming an anular bond resiliently holding said end portions of the tools having faces thereon in a cooperating position, a reciprocably driven rod disposed axially in said first guide and guided therein for impacting the pair of tools simultaneously thereby to cause them to impact the workpiece when said apparatus is employed on said workpiece.

References Cited in the file of this patent

UNITED STATES PATENTS

| | | |
|---|---|---|
| 1,386,249 | Gander | Aug. 2, 1921 |
| 1,669,116 | Barber | May 8, 1928 |
| 1,784,866 | Fahrenwald | Dec. 16, 1930 |
| 1,986,426 | De Bats | Jan. 1, 1935 |
| 2,010,996 | Junkers | Aug. 13, 1935 |
| 2,053,009 | Schmidt | Sept. 1, 1936 |
| 2,060,803 | Falk | Nov. 17, 1936 |
| 2,114,978 | Horger et al. | Apr. 19, 1938 |
| 2,236,944 | Gerardi | Apr. 1, 1941 |
| 2,279,562 | Dunlap | Apr. 14, 1942 |
| 2,325,237 | Falk | July 27, 1943 |
| 2,658,259 | Aldino et al. | Nov. 10, 1953 |
| 2,798,388 | Eckold | July 9, 1957 |
| 2,815,932 | Wolfram | Dec. 10, 1957 |

FOREIGN PATENTS

| | | |
|---|---|---|
| 426,020 | Germany | Mar. 3, 1926 |
| 816,656 | Germany | Oct. 11, 1951 |